United States Patent [19]

Carson et al.

[11] Patent Number: 5,497,400
[45] Date of Patent: Mar. 5, 1996

[54] DECISION FEEDBACK DEMODULATOR WITH PHASE AND FREQUENCY ESTIMATION

[75] Inventors: Lansing M. Carson, Chandler; Robert J. Burdge, Mesa, both of Ariz.

[73] Assignee: Motorola, Inc., Schaumburg, Ill.

[21] Appl. No.: 161,845

[22] Filed: Dec. 6, 1993

[51] Int. Cl.$^6$ .......................... H04L 27/14; H04L 27/16; H04L 27/22

[52] U.S. Cl. .................. 375/324; 375/326; 375/376; 375/377; 455/334; 327/233; 327/39

[58] Field of Search .................... 375/80, 881, 118, 375/120, 324, 371, 325, 373, 326, 376, 327, 334, 337; 455/334, 337; 307/511, 510, 518, 520, 359, 233, 39, 18, 551, 73

[56] References Cited

U.S. PATENT DOCUMENTS

| | | | |
|---|---|---|---|
| 4,320,526 | 3/1982 | Gitlin | 375/118 |
| 4,712,222 | 12/1987 | Heard et al. | 375/77 |
| 4,777,640 | 10/1988 | Turner et al. | 375/118 |
| 4,796,188 | 1/1989 | Gale et al. | 375/118 X |
| 4,968,955 | 11/1990 | Yoshida et al. | 329/304 |
| 4,977,580 | 12/1990 | McNicol | 375/97 |
| 4,987,386 | 1/1991 | Poklemba et al. | 331/10 |
| 5,007,068 | 4/1991 | Simon et al. | 375/53 |
| 5,049,830 | 9/1991 | Yoshida | 329/304 |
| 5,097,220 | 3/1992 | Shimakata et al. | 329/306 |
| 5,115,454 | 5/1992 | Kucar | 375/77 |
| 5,287,067 | 2/1994 | Denno et al. | 375/80 X |

OTHER PUBLICATIONS

"Maximum Likelihood Carrier Phase Recovery for Linear Suppressed-Carrier Digital Data Modulations" by Pooi Yuen Kam, Member IEEE, from IEEE Transactions on Communications, vol. Comm-34, Jun. 6, 1986.

"Low-Overhead Symbol Timing and Carrier Recovery for TDMA Portable Radio Systems" by Nelson R. Sollenberger, Senior Member, IEEE and Justing C.-I. Chuang, Senior Member, IEEE, from IEEE Transactions on Communications, vol. 38, No. 10, Oct. 1990.

*Primary Examiner*—Stephen Chin
*Assistant Examiner*—Bryan E. Webster
*Attorney, Agent, or Firm*—Frederick M. Fliegel

[57] ABSTRACT

A data communication receiver (10) uses a decision feedback demodulator (32) to remove data from a received signal. Quadrature components of the received signal define a received phase. The received phase is rotated (46) by an amount predicted to compensate for phase and frequency errors. After this rotation, a decision circuit (52) determines the modulation phase for a current symbol. A phase rotator (64) compares the modulation phase with the received phase to generate a measured phase error for the symbol. This measured phase error and measured phase errors from past symbols are averaged in a combination circuit (80) to produce a phase estimate. The past measured phase errors are also processed to determine the amount of change in measured phase error that has occurred over a number of symbols. This processing yields a frequency estimate. A phase rotator (94) merges the frequency and phase estimates for use in compensating a current received phase.

23 Claims, 4 Drawing Sheets

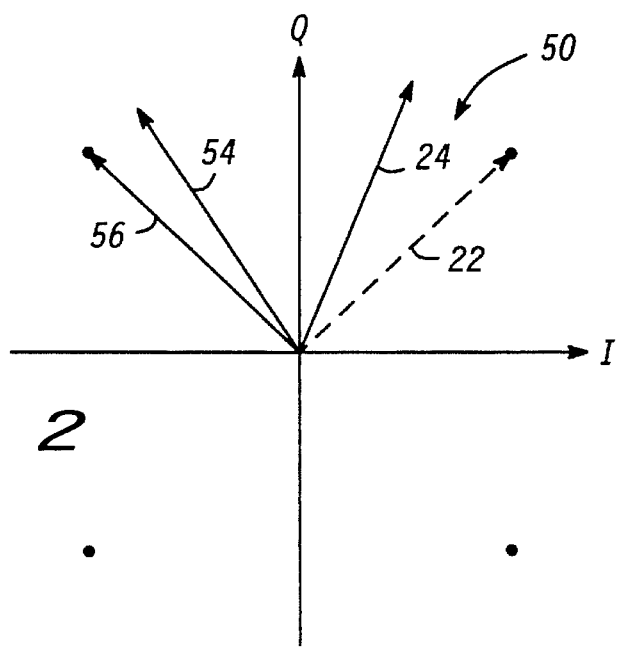
FIG. 2
FIG. 3
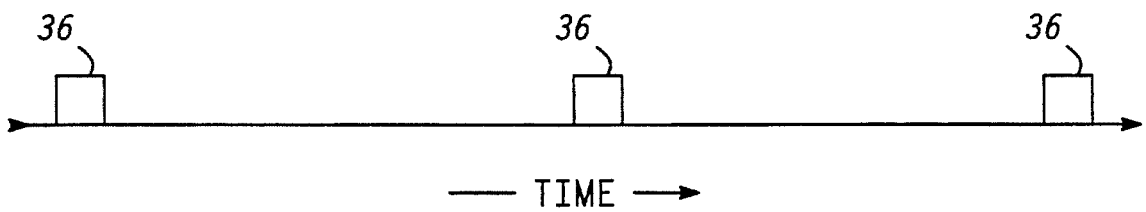
FIG. 4

DECISION FEEDBACK DEMODULATOR WITH PHASE AND FREQUENCY ESTIMATION

TECHNICAL FIELD OF THE INVENTION

The present invention relates generally to digital demodulators. More specifically, the present invention relates to digital demodulators which use data decision feedback in removing data conveyed by a modulated signal.

BACKGROUND OF THE INVENTION

Data communication receivers use digital demodulators to recover data from a received signal. A transmitter modulates a corresponding transmitted signal in a manner that conveys the data being communicated. A wide variety of modulation schemes are used in data communications, and many of these schemes, such as M-PSK and QAM, convey data through phase relationships between quadrature components of the transmitted signal. A digital demodulator in a data communication receiver operates in accordance with a selected modulation scheme to recover the data being conveyed.

Various non-coherent demodulation techniques are known. Non-coherent demodulation techniques do not rely on past data decisions in making current data decisions. These non-coherent techniques typically include squaring or higher order mathematical operations, such as raising signals to the fourth power for QPSK. Such operations are highly undesirable. They multiply the amount of Doppler which may be present in the received signal and correspondingly increase the noise level. Consequently, non-coherent demodulation techniques are often unacceptable for high Doppler or low signal-to-noise ratio (SNR) environments.

Coherent demodulation techniques provide desirable alternatives to non-coherent demodulation techniques for many low SNR environments. Coherent demodulation techniques use information derived from past data decisions in making current data decisions. Higher order mathematical operations may be avoided, and Doppler and noise influences in a received signal are not aggravated.

Unfortunately, prior art demodulators which use data decision feedback work satisfactorily only so long as either phase error between quadrature components experiences small change from symbol to symbol or a large amount of phase jitter may be tolerated. These are unreasonable restraints for many situations, such as when significant Doppler or other frequency offsets are present. Moreover, prior art data decision feedback demodulators tend to slowly acquire received signals. Inaccurate data decisions are likely during acquisition because little or no past decision data are available upon which to base current data decisions. Prior art data decision feedback demodulators feed these incorrect data decisions back so that the chances of making correct data decisions in the near future are low.

SUMMARY OF THE INVENTION

Accordingly, it is an advantage of the present invention that an improved decision feedback demodulator is provided.

Another advantage of the present invention is that frequency estimates are made in response to past data decisions, and these frequency estimates are combined with phase estimates for use in making current data decisions.

Another advantage of the present invention is that features are provided to allow a decision feedback demodulator to quickly acquire a received signal.

The above and other advantages of the present invention are carried out in one form by a method for demodulating a received signal that has been modulated to convey discrete predetermined data codes in a stream of symbols. The method calls for estimating a change in phase error for the received signal over past symbols. An average phase error is also estimated for the received signal over past symbols. The average phase error is combined with the phase error change to form a merged phase error estimate. A decision is made that identifies one of the predetermined data codes as being conveyed in a current symbol. This decision is made in response to the received signal and to the merged phase error estimate.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 is a phase node diagram consistent with a QPSK modulation scheme;

FIG. 3 is a timing diagram of a received signal;

FIG. 4 is a data format diagram of a single burst of the received signal;

DETAILED DESCRIPTION OF THE PREFERRED EMBODIMENTS

Figure 1:
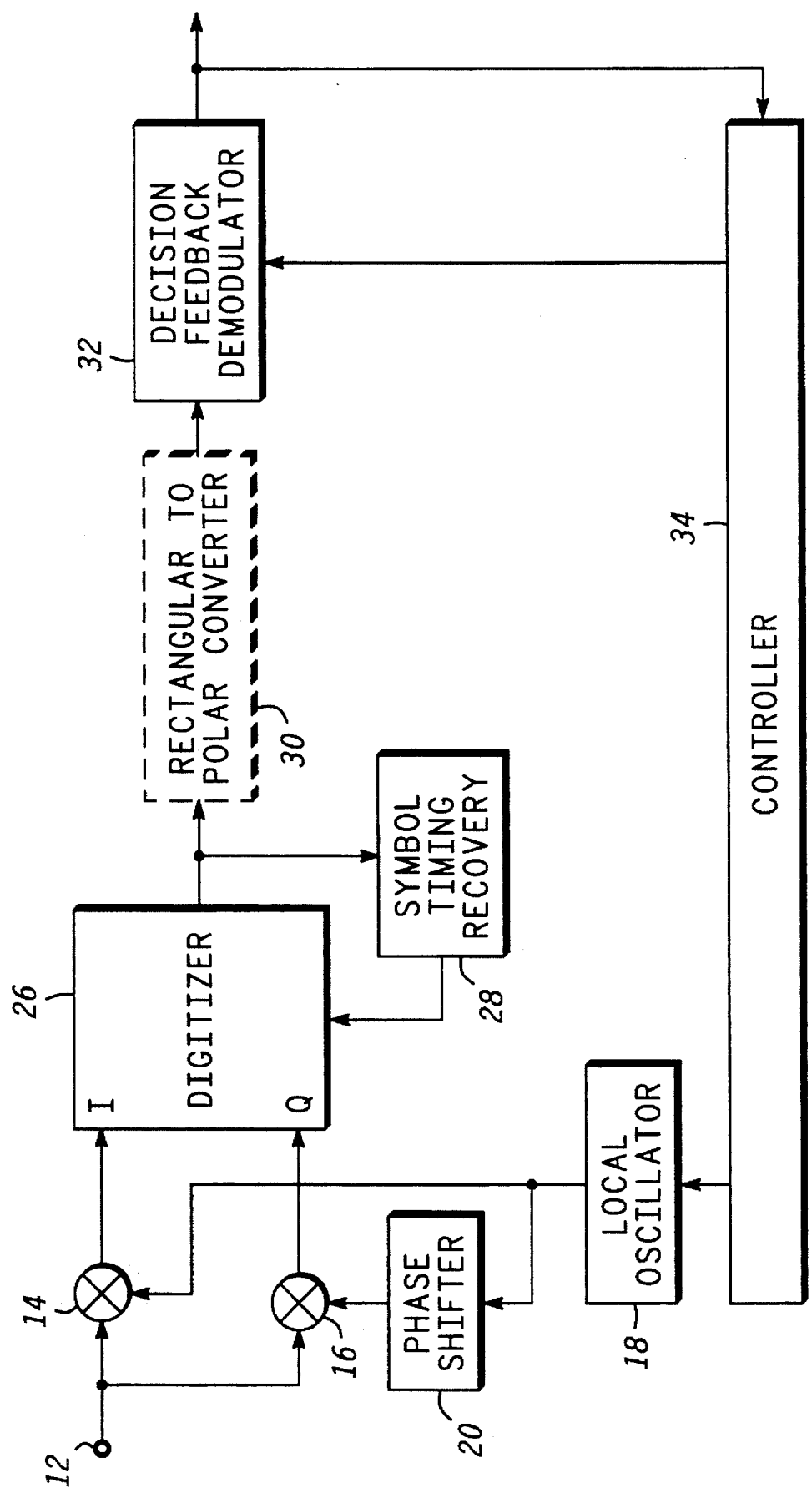
FIG. 1 is a block diagram of a data communication receiver that includes a decision feedback demodulator.

FIG. 1 is a block diagram of data communication receiver 10. An input 12 of receiver 10 obtains a received signal that has been modulated to convey discrete predetermined data codes. The present invention may be adapted to many modulation formats. While the embodiments discussed below specifically refer to a QPSK modulation example, those skilled in the art can easily adapt the teaching presented herein to other modulation formats which, like QPSK, use phase relationships between quadrature components of the received signal to convey data.

Input 12 couples to first inputs of mixers 14 and 16, respectively. Local oscillator 18 has an output which couples to a second input of mixer 14 and to an input of 90° phase shifter 20. Mixers 14 and 16 respectively generate I and Q baseband signals which correspond to in-phase (I) and in-quadrature (Q) components of the received signal.

FIG. 2 is a phase node diagram consistent with a QPSK modulation scheme. One data code is conveyed during every symbol interval or baud interval, hereinafter referred to as a symbol. A stream of symbols is conveyed by the received signal. In the QPSK example, each data code is expressed as one of four potential phase relationships between I and Q components. These modulation phases may be assigned values of ±45° and ±135°. Dotted vector 22 shown in FIG. 2 illustrates a modulation phase of +45°. These values are considered modulation values because they are the phase values used in modulating the received signal prior to its reception at receiver 10. On the other hand, the actual received phase values detected at receiver 10 may differ from the modulation values. Vector 24 shown in FIG. 2 illustrates a exemplary received phase of around +65°.

Referring back to FIG. 1, the outputs of mixers 14 and 16 couple to I and Q inputs, respectively, of digitizer 26. However, those skilled in the art will appreciate that appropriate filtering (not shown) may be inserted between the mixers and digitizer 26. An output of digitizer 26 couples to an input of symbol timing recovery circuit 28, and an output of symbol timing recovery circuit 28 couples back to another input of digitizer 26. Digitizer 26 obtains samples of the I and Q components of the received signal. Any number of I and Q sample sets may be taken during each symbol. However, digitizer 26 and symbol timing recovery circuit 28 cooperatively operate to detect the single set of I and Q samples that occurs at a peak or maximum eye-opening condition, typically located in the middle of each symbol.

This single set of I and Q samples produced during each symbol expresses the received signal in terms of a Cartesian or rectangular coordinate system definition of its quadrature components. The present invention may be practiced using quadrature components expressed as either rectangular coordinates or polar coordinates. Thus, an input of an optional rectangular-to-polar converter 30 (dotted-line box, FIG. 1), may couple to the output of digitizer 26 to convert quadrature components expressed in rectangular coordinates into quadrature components expressed in polar coordinates. Rectangular to polar converter 30 may be omitted when the present invention is practiced using rectangular coordinates. Rectangular to polar converter 30 may generate one set of polar coordinate values per symbol. Magnitude data may be omitted for the purposes of the present invention. Thus, rectangular to polar converter 30 may generate only a single phase value every symbol. That phase value identifies the phase relationship between I and Q components of the received signal during the symbol.

An output of rectangular to polar converter 30 couples to an input of decision feedback demodulator 32. Generally speaking, demodulator 32 decides which data code is being conveyed during each symbol in response to the phase relationship between quadrature components of the received signal during that symbol. Demodulator 32 is discussed in more detail below in connection with FIG. 5. Demodulator 32 outputs a modulation phase and/or corresponding data code for every symbol. This data may be passed to post-decision processing circuits (not shown), such as delta demodulation circuits, error correction circuits, and the like.

The output of demodulator 32 may also be routed to controller 34. Controller 34 has outputs that couple to control inputs of local oscillator 18 and demodulator 32. Controller 34 controls local oscillator 18 by roughly specifying a frequency for use in the down-conversions performed by mixers 14 and 16. Controller 34 controls demodulator 32 by specifying an operational mode, such as an access mode, an acquisition mode, and a steady state mode.

FIGS. 3, 4 illustrate various modes of operation encountered by one embodiment of communication receiver 10 and decision feedback demodulator 32. FIG. 3 is a timing diagram of the received signal. The received signal may be partitioned into bursts 36. Each burst 36 includes a stream of up to hundreds or thousands of symbols. Bursts 36 desirably repeat at more or less equally spaced intervals. During the access mode, receiver 10 (FIG. 1) has only poor quality information defining the frequency of the received signal and the instants at which bursts 36 begin. A high bit error rate (BER) may be tolerated during the access mode because the purpose of the access mode is to allow receiver 10 to gain access to the received signal rather than to communicate data. While rapid access is desirable, it need not be a critical parameter because operation in the access mode occurs only infrequently. Access to the received signal has occurred when receiver 10 gains sufficient higher quality information defining the frequency and timing of the received signal. Controller 34 (FIG. 1) determines when access has occurred, but the timing of this determination is not important to the present invention.

FIG. 4 is a data format diagram of single burst 36 of the received signal. Preamble 38 occurs first in burst 36. Unique word 40 follows preamble 38, and payload section 42 follows unique word 40. Preamble 38 is an easily detected code which is included to help receiver 10 (FIG. 1) achieve acquisition. In the preferred embodiments, the received signal exhibits a constant amount of modulation phase change from symbol to symbol during preamble 38. One example of this constant phase change from symbol to symbol could be provided by a code of alternating 1's and 0's. Receiver 10 operates in its acquisition mode at the beginning of each burst 36.

Desirably, receiver 10 switches out of its acquisition mode and into its steady state mode around the end of preamble 38. Controller 34 (FIG. 1) controls this switching function in response to data provided by demodulator 32 and may include a correlator (not shown) to detect the occurrence of the unique word to further refine timing information.

Receiver 10 continues in its steady state mode throughout unique word 40 and payload section 42. The main purpose of receiver 10 is to receive the data codes conveyed in payload section 42. Preamble 38 and unique word 40 represent system overhead. The number of symbols included in preamble 38 and unique word 40 is desirably as few as possible. Consequently, it is desirable that receiver 10 and demodulator 32 (FIG. 1) acquire each burst 36 rapidly so that payload section 42 may occupy as large a portion of each burst 36 as possible.

Figure 5:
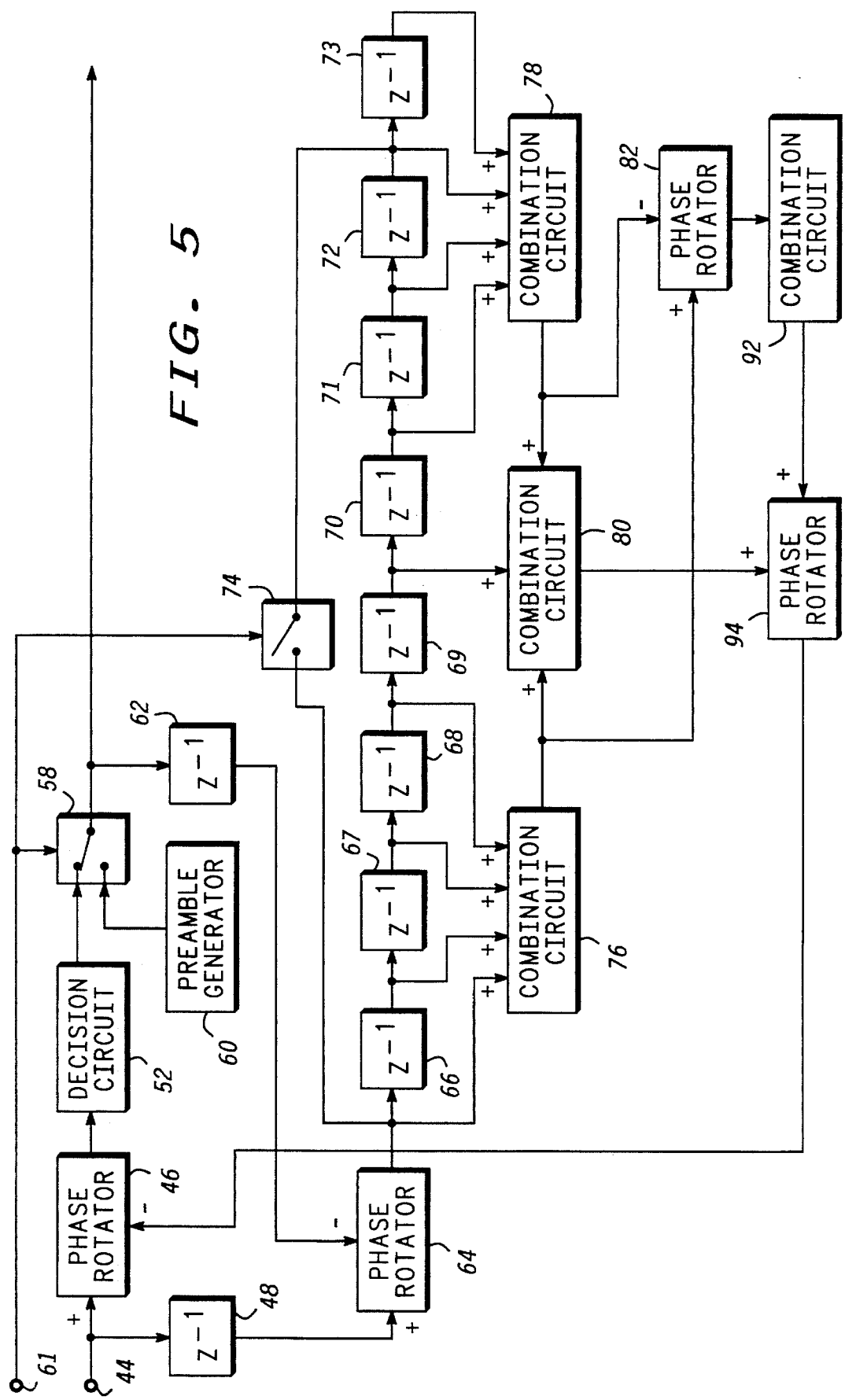
FIG. 5 is a block diagram of a decision feedback demodulator configured in accordance with the principles of the present invention.

FIG. 5 is a block diagram of an embodiment of decision feedback demodulator 32. As discussed above, demodulator 32 obtains the received signal as defined by its I and Q quadrature components. The received phase between the quadrature components may be expressed in either rectangular or polar coordinates in different embodiments of the present invention. The block diagram of FIG. 5 applies to either rectangular or polar embodiments of demodulator 32. A new received phase value is obtained for every symbol. The received signal is applied at terminal 44.

Terminal 44 couples to a positive input of phase rotator 46 and to an input of one-symbol delay element 48. A negative input of phase rotator 46 is configured to receive a merged phase error estimate for that symbol. Generally speaking, this phase error estimate provides a prediction of the amount of phase error present in the received signal during the symbol currently being evaluated by demodulator 32, hereinafter called a current symbol. Referring briefly back to FIG. 2, an angle 50 identifies the phase error between the modulated phase of vector 22 and the received phase of vector 24. It is angle 50 that the merged phase error estimate attempts to predict. The manner in which the merged phase error estimate is generated is discussed below.

Phase rotator 46 combines the phase information provided by the received signal and the merged phase error estimate. This phase information is combined in such a way that the received phase is rotated clockwise (CW) by the angle defined by the merged phase error estimate. In other words, the direction of rotation compensates for phase error rather than increases phase error. Phase rotator 46 produces one error compensated modulation sample every symbol, and the one sample describes the current symbol.

Those skilled in the art will appreciate that CW phase rotation, whether this one or other phase rotations discussed below, may be carried out differently depending upon whether rectangular or polar coordinates are being used. If rectangular coordinates are being used, a complex conjugation operation may be performed on the merged phase error estimate, then complex multiplication may be performed between the conjugated merged phase error estimate and the received signal. If rectangular coordinates are being used, the complex multiplication produces a complex value which preserves magnitude and phase information. If polar coordinates are being used, a subtraction operation is performed between phase values for the received signal and the merged phase error estimate. The result of this subtraction operation is another phase value.

The output from phase rotator 46 couples to an input of decision circuit 52. Decision circuit 52 selects a data code and/or corresponding modulation phase which most closely resembles the error compensated modulation sample for the current symbol. One modulation phase is generated for each symbol, and that one modulation phase characterizes the current symbol. Such decision circuits are well known to those skilled in the art and need not be discussed further herein. Referring briefly to FIG. 2, if an error compensated modulation sample for a current symbol indicated vector 54, for example, then decision circuit 52 would generate vector 56 in response because vector 56 identifies the modulation phase closest to vector 54.

An output of decision circuit 52 (FIG. 5) couples to a first data input of selection circuit 58. A second data input of selection circuit 58 couples to an output of circuit 60 which generates a predetermined data code, such as preamble 38 (FIG. 1). A control input of selection circuit 58 couples through control bus terminal 61 to controller 34. In steady state operation, selection circuit 58 selects the modulation phase output from decision circuit 52. In the acquisition mode, selection circuit 58 selects the predetermined preamble code output by circuit 60.

The output of selection circuit 58 provides the output from demodulator 32. In steady state operation this output represents the data code for the current symbol and equals the modulation phase, perhaps accompanied by its associated data code.

Figure 6:
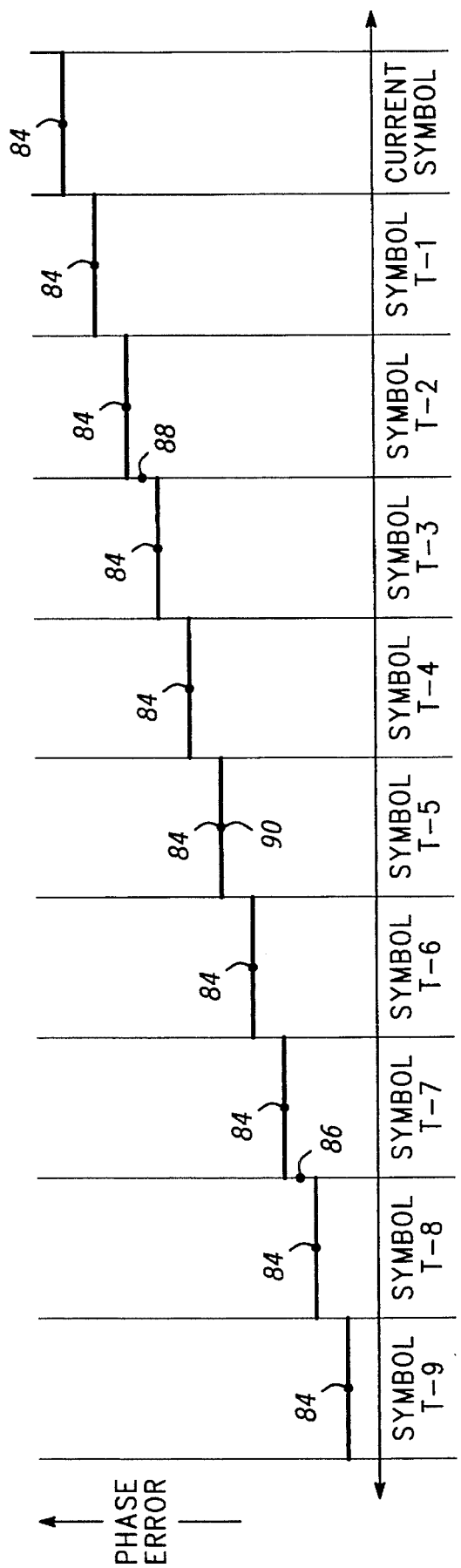
FIG. 6 is a timing diagram depicting exemplary phase errors over several symbol intervals.

The output of selection circuit 58 couples to an input of one-symbol delay element 62. An output of delay element 62 couples to a negative input of phase rotator 64 and an output of delay element 48 couples to a positive input of phase rotator 64. The output of delay element 62 conveys the modulation phase for the symbol immediately preceding the current symbol. FIG. 6 is a timing diagram depicting exemplary phase errors over several symbol intervals, including an immediately preceding symbol T-1. The output of delay element 48 (FIG. 5) conveys the received phase for symbol T-1. The output of phase rotator 64 rotates the received phase for symbol T-1 by the amount of the modulation phase selected for symbol T-1, i.e., phase rotator 64 measures the phase error or phase offset encountered between the modulation phase and the actual received phase, after compensation by a prior merged phase error estimate. Phase rotator 64 generates one measured phase error per symbol.

The measured phase error for symbol T-1 is used, in combination with measured phase errors from other past symbols, to generate the above-discussed merged phase error estimate for the current symbol. Delay element 62 is used to prevent instability. Delay element 62 prevents the current symbol merged phase error estimate from being responsive to the current symbol measured phase error. Delay element 48 synchronizes received phase with modulation phase for rotation by phase rotator 64.

An output of phase rotator 64 couples to a bank of series connected, one-symbol delay elements. The output of phase rotator 64 feeds delay element 66, which in turn feeds delay elements 67, 68, 69, 70, 71 and then 72, which feeds delay element 73. Delay elements 66–73 record the measured phase errors generated by phase rotator 64 for past symbols. The output of delay element 66 provides the measured phase error for symbol T-2 (FIG. 6), and the output of delay element 73 provides the measured phase error for symbol T-9. The precise number of delay element stages is not critical. This number is chosen to provide phase jitter levels less than a desired amount. More delay element stages produce less phase jitter.

On the other hand, a smaller number gives demodulator 32 wider bandwidth and makes it more responsive to fast-occurring measured phase error changes. Accordingly, an output of phase rotator 64 couples to a first port of switching circuit 74 and an input of delay element 73 couples to a second port of switching circuit 74. A control input of switching circuit 74 couples through control bus terminal 61 to controller 34 (FIG. 1). During the steady state mode of operation, switching circuit 74 does not route the output of phase rotator 64 directly to the input of delay element 73. Consequently, the full number of delay stages are provided by delay elements 66–73. However, during the access mode of operation, switching circuit 74 routes the output of phase rotator 64 to the input of delay element 73. Although not specifically shown in FIG. 5, delay elements 66–72 are prevented from influencing the generation of the merged phase error estimate. Thus, during the access mode, the number of delay elements is reduced, and demodulator 32 exhibits wide bandwidth so that it can track rapidly changing measured phase errors.

The output of phase rotator 64 couples to a first input of combination circuit 76, the output of delay element 66 couples to a second input of combination circuit 76, the output of delay element 67 couples to a third input of combination circuit 76, and the output of delay element 68 couples to a fourth input of combination circuit 76. Likewise, the output of delay element 70 couples to a first input of combination circuit 78, the output of delay element 71 couples to a second input of combination circuit 78, the output of delay element 72 couples to a third input of combination circuit 78, and the output of delay element 73 couples to a fourth input of combination circuit 78. An output of combination circuit 76 couples to a first input of combination circuit 80 and to a positive input of phase rotator 82. An output of combination circuit 78 couples to a second input of combination circuit 80 and to a negative input of phase rotator 82.

Each of combination circuits 76, 78, and 80 generate a combined phase value that corresponds to the phase values provided thereto. Each generates one combined phase value per symbol. In a rectangular coordinate embodiment, combination circuits 76, 78, and 80 may each be complex adders. In a polar coordinate embodiment, combination circuits 76, 78, and 80 may each be averaging circuits. The combined phase values generated thereby represent an average of the respective phase values.

In the embodiment of the present invention illustrated in FIG. 5, an odd number of measured phase errors are provided by phase rotator 64 and delay elements 66–73. In particular, 2N+1 measured phase errors are available for processing by combination circuits 76, 78, and 80, where N is an integer value which equals four in the FIG. 5 embodiment. The most recent N of the measured phase errors are combined in combination circuit 76. The least recent N of the measured phase errors are combined in combination circuit 78, and all 2N+1 measured phase errors are combined in combination circuit 80. Combination circuit 76 generates a single recent combined phase error value for each symbol, combination circuit 78 generates a single old combined phase error value for each symbol, and combination circuit 80 generates a single overall average phase error value for each symbol.

Referring to FIG. 6, the timing diagram illustrates exemplary measured phase errors from symbol T-9 through the current symbol. In this example, the measured phase errors continually change. Thus, the example is consistent with situations in which Doppler or other frequency offsets are present. Old combined phase error 86 describes the value generated by combination circuit 78 (FIG. 5). Recent combined phase error 88 describes the value generated by combination circuit 76. Average phase error 90 describes the value generated by combination circuit 80.

Average phase error 90 (FIG. 6) lags measured phase error for the current symbol by X symbols, where X is a real number equal to five when nine measured phase errors are recorded. The average phase error represents a received signal phase estimate. If this phase estimate were used in lieu of the merged phase error estimate to compensate the received signal, an error bias equivalent to the phase change over five symbols would be injected in the decisions made by decision circuit 52 (FIG. 5).

Accordingly, a frequency estimate is made to compensate for this lagging bias inherent in the phase estimate. Since, in this example, the phase error bias is equivalent to phase change over five symbols, the frequency estimate corresponds to the phase change over five symbols, as shown between combined old and recent phase errors 86, 88 (FIG. 6).

Phase rotator 82 (FIG. 5) determines the phase change between the recent and old combined phase errors. This phase change corresponds to the Doppler and/or other frequency offsets present in the received signal. The output of phase rotator 82 couples to the input of combination circuit 92. Combination circuit 92 acts as a filter. In a rectangular coordinate embodiment of the present invention, combination circuit 92 integrates or adds the phase difference values produced by phase rotator 82 over a predetermined number of symbols. In a polar coordinate embodiment of the present invention, combination circuit 92 averages the phase difference values produced by phase rotator 82 over a predetermined number of symbols. In one embodiment, combination circuit 92 combines phase difference values obtained over the entire burst 36 (FIG. 3).

The outputs of combination circuits 92, 80 couple to first and second positive inputs of phase rotator 94, which rotates the average phase error counterclockwise by an amount equivalent to the phase error change, i.e., the average phase error angle, which lags the current symbol, is added to a phase change angle, which estimates the change occurring in measured phase error over the duration by which the average phase error lags the current symbol. Phase rotator 94 combines the phase estimate with a frequency estimate to produce the merged phase error estimate used in making a current symbol data decision.

Those skilled in the art will appreciate that this process repeats for each symbol in the stream of symbols. This repetition continues so long as demodulator 32 operates in the steady state mode.

However, demodulator 32 operates in an open loop fashion during the acquisition mode. In the acquisition mode, selection circuit 58 is controlled so that the predetermined preamble code is produced by demodulator 32 regardless of the merged phase error estimates generated by phase rotator 94. Open loop operation allows demodulator 32 to rapidly acquire the received signal at the beginning of burst 36 (FIG. 3). Rapid acquisition occurs because the delay element bank of delay element 62 and delay elements 66–73 is primed with measured phase errors that result from making correct data decisions. The data decisions are known to be correct because the preamble is known prior to the beginning of the burst 36, and this known preamble is provided as the output from demodulator 32. As soon as delay elements 66–73 become filled with accurate measured phase errors, zero bias merged phase error estimates are available, and decision circuit 52 has high probability of making accurate data decisions.

On the other hand, if demodulator 32 were allowed to operate in closed loop fashion during the acquisition mode, decision circuit 52 would probably make some inaccurate data decisions during acquisition because delay elements 66–73 would include invalid data. These inaccurate data decisions would generate inaccurate measured phase errors, which would continue to fill delay elements 66–73 with invalid data. Acquisition would eventually occur, but it would occur more slowly than with the open loop operation described above.

In summary, the present invention provides an improved decision feedback demodulator. The decision feedback demodulator of the present invention makes both phase and frequency estimates based on past data decisions. The phase and frequency estimates are combined for use in making current data decisions. Moreover, the present invention achieves rapid acquisition of a received signal through open loop operation during an acquisition mode.

The present invention has been described above with reference to preferred embodiments. However, those skilled in the art will recognize that changes and modifications may be made in these preferred embodiments without departing from the scope of the present invention. For example, while the above-description discusses a QPSK modulation example, those skilled in the art can easily adapt the teaching of the present invention to other modulation schemes. Likewise, the above description discusses particular polarities and implementation details. Those skilled in the art can easily design alternate implementations which practice the invention set forth herein. These and other changes and modifications which are obvious to those skilled in the art are intended to be included within the scope of the present invention.

What is claimed is:

1. A method for demodulating a received signal that has been modulated to convey discrete predetermined data codes in a stream of symbols, said method comprising steps of:

estimating a phase error change for said received signal over past symbols;

estimating an average phase error for said received signal over past symbols;

combining said average phase error and said phase error change to form a merged phase error estimate; and deciding which one of said discrete predetermined data codes is conveyed in said current symbol, said deciding step responding to said received signal and to said merged phase error estimate, wherein said estimating an average phase error step is configured to generate an average phase error that lags said current symbol by X symbols, where X is a real number, and said estimating a change in phase error step is configured to determine phase change over approximately X symbols.

2. A method as claimed in claim 1 wherein said method additionally comprises a step of obtaining quadrature components from said received signal, and said deciding step comprises steps of:

rotating said quadrature components by an angle which is responsive to said merged phase error estimate to produce an error compensated modulation signal; and selecting a modulation phase to associate with said error compensated modulation signal, said modulation phase corresponding to said one of said discrete predetermined data codes conveyed in said current symbol.

3. A method as claimed in claim 1 additionally comprising steps of:

measuring, in response to said deciding step, a phase error for each symbol in said stream of symbols to provide phase errors;

combining said phase errors from a first set of said symbols to produce a first combined phase error; and combining said phase errors from a second set of said symbols to produce a second combined phase error, said first set of said symbols occurring more recently than said second set of said symbols, and said estimating a change in phase error step being responsive to said first and second combined phase errors.

4. A method as claimed in claim 1 wherein:

said method additionally comprises a step of generating quadrature components from said received signal for said current symbol, said quadrature components exhibiting a received phase therebetween;

said deciding step comprises a step of associating, for said current symbol, a modulation phase with said one of said discrete predetermined data codes; and said method additionally comprises a step of rotating said received phase by said modulation phase to produce a phase error for said current symbol.

5. A method as claimed in claim 4 additionally comprising a step of performing said rotating step one symbol after performance of said deciding step so that said merged phase error estimate for said current symbol is substantially unresponsive to said phase error for said current symbol.

6. A method as claimed in claim 1 wherein said method additionally comprises a step of measuring, in response to said deciding step, a phase error for each symbol in said stream of symbols, and said estimating phase error change step comprises steps of:

recording said phase errors for a predetermined number of said past symbols to provide recorded phase errors;

combining a most recent first portion of said predetermined number of recorded phase errors to produce a recent combined phase error;

combining a least recent second portion of said predetermined number of recorded phase errors to produce an old combined phase error; and finding a phase difference between said old and recent combined phase errors.

7. A method as claimed in claim 6 wherein said estimating phase error change step further comprises steps of:

repeating said recording, combining, and finding steps for each symbol from said stream of symbols; and combining phase differences from said finding step for a plurality of said symbols from said stream of symbols.

8. A method as claimed in claim 6 additionally comprising steps of:

detecting operation in an access mode; and reducing said predetermined number during said access mode.

9. A method as claimed in claim 1 wherein:

said method additionally comprises a step of measuring, in response to said deciding step, a phase error for each symbol in said stream of symbols;

said method additionally comprises a step of recording said phase errors for each of $2N+1$ of said past symbols, where N is an integer number;

said estimating an average phase error step comprises a step of combining said $2N+1$ recorded phase errors; and said estimating phase error change step comprises steps of:

combining a most recent N of said $2N+1$ recorded phase errors to produce a recent combined phase error, combining a least recent N of said $2N+1$ recorded phase errors to produce an old combined phase error, and finding a phase difference between said old and recent combined phase errors.

10. A method as claimed in claim 1 wherein:

said method additionally comprises a step of detecting operation in an acquisition mode; and said deciding step comprises a step of generating a predetermined code during said acquisition mode, said predetermined code being substantially unresponsive to said merged phase error estimate.

11. In a decision feedback demodulator in which an estimated phase error for a current symbol from a stream of symbols is used in estimating data for said current symbol and in generating a measured phase error, and said estimated phase error is based upon measured phase errors from past symbols, a method for demodulating a received signal comprising steps of:

a) recording said measured phase errors for at least 2N of said past symbols to provide at least 2N recorded phase errors, where N is an integer number;

b) generating a recent phase error which is responsive to a first one of said at least 2N recorded phase errors;

c) generating an old phase error which is responsive to a second one of said at least 2N recorded phase errors, said first one of said at least 2N recorded phase errors occurring more recently than said second one of said at least 2N recorded phase errors;

d) finding a phase difference between said old and recent phase errors;

e) generating an average phase error which approximates an average of said at least 2N recorded phase errors; and f) generating said estimated phase error in response to said phase difference and said average phase error.

12. A method as claimed in claim 11 wherein:

said step b) comprises a step of combining a first N recorded phase errors of said at least 2N recorded phase errors, said first N recorded phase errors including said first one of said recorded phase errors; and said step c) comprises a step of combining a second N recorded phase errors of said at least 2N recorded phase errors, said second N recorded phase errors including said second one of said recorded phase errors, and said second N recorded phase errors occurring before said first N recorded phase errors.

13. A method as claimed in claim 11 wherein:

said step a) records 2N+1 of said measured phase errors to provide 2N+1 recorded phase errors; and said step e) is responsive to said 2N+1 recorded phase errors.

14. A method as claimed in claim 11 wherein:

said step e) is configured to generate an average phase error that lags said current symbol by X symbols, where X is a real number; and said steps b) and c) are cooperatively configured so that said step d) finds said phase difference occurring over approximately X symbols.

15. A method as claimed in claim 11 additionally comprising steps of:

repeating said steps a), b), c) and d) for each symbol from said stream of symbols; and combining said phase differences from said repetitions of said step d) for a plurality of said symbols to produce a combined phase difference so that said estimated phase error is responsive to said combined phase difference.

16. A method as claimed in claim 11 additionally comprising steps of:

detecting operation in an access mode; and reducing N during said access mode.

17. A method as claimed in claim 11 additionally comprising steps of:

selecting a modulation phase for said current symbol, said modulation phase being responsive to said received signal and said estimated phase error;

generating a predetermined code which is not responsive to said estimated phase error;

generating said measured phase error in response to said modulation phase and said received signal during a steady state mode; and generating said measured phase error in response to said predetermined code and said received signal during an acquisition mode.

18. A circuit for demodulating a received signal that has been modulated to convey discrete predetermined data codes in a stream of symbols, said circuit comprising:

recording means for recording a plurality of measured phase errors, each of said plurality of measured phase errors corresponding to a difference, during one of said symbols, between an estimated modulation phase and a received phase exhibited between quadrature components of said received signal;

a combination circuit, coupled to said recording means, for generating an average phase error which approximates an average of said plurality of measured phase errors;

a first phase rotator, coupled to said recording means, for determining a phase change exhibited by at least a portion of said plurality of measured phase errors;

a second phase rotator, coupled to said first phase rotator and said combination circuit, for determining an estimated phase error; and decision means, coupled to said second phase rotator and being responsive to said received signal, for generating said estimated modulation phase.

19. A circuit as claimed in claim 18 wherein said recording means comprises at least 2N storage elements arranged to record at least 2N of said plurality of measured phase errors to provide at least 2N measured phase errors, where N is an integer number, and said circuit additionally comprises:

a second combination circuit, coupled between a first N of said at least 2N storage elements and said first phase rotator, for combining a first N of said at least 2N measured phase errors; and a third combination circuit, coupled between a second N of said 2N storage elements and said first phase rotator, for combining a second N of said at least 2N measured phase errors, said second N of said plurality of measured phase errors occurring after said first N of said plurality of measured phase errors in said stream of symbols.

20. A circuit as claimed in claim 18 wherein:

said recording means comprises 2N+1 storage elements arranged to record 2N+1 of said plurality of measured phase errors to provide 2N+1 measured phase errors, where N is an integer number; and said combination circuit generates said average phase error based upon said 2N+1 measured phase errors.

21. A circuit as claimed in claim 18 wherein:

said decision means operates on a current symbol of said stream of symbols while said recording means records said measured phase errors from past ones of said stream of symbols;

said combination circuit is configured so that said average phase error lags said current symbol by X symbols, where X is a real number; and said first phase rotator is configured to determine change in phase over approximately X symbols.

22. A circuit as claimed in claim 18 additionally comprising a second combination circuit coupled between said first phase rotator and said second phase rotator, said second combination circuit generating an average of phase changes determined during a plurality of symbols from said stream of symbols.

23. A circuit as claimed in claim 18 additionally comprising:

a code generator for providing a predetermined code, said predetermined code being substantially unresponsive to said estimated phase error;

selection means having data inputs coupled to said decision means and to said code generator, having a control input, and having an output;

a third phase rotator, coupled between said selection means output and said recording means, for generating said plurality of measured phase errors; and a controller, coupled to said control input of said selection means, said controller being configured to operate said selection means so that said plurality of measured phase errors are generated in response to said estimated modulation phase and said received signal during a steady state mode, and said plurality of measured phase errors are generated in response to said predetermined code and said received signal during an acquisition mode.

* * * * *